US007853447B2

(12) United States Patent
Yen et al.

(10) Patent No.: US 7,853,447 B2
(45) Date of Patent: Dec. 14, 2010

(54) METHOD FOR VARYING SPEECH SPEED

(75) Inventors: Ming Hsiang Yen, Kaohsiung (TW); Jui Yu Yen, Kaohsiung (TW); Kuang Chien Kao, Kaohsiung (TW)

(73) Assignee: Micro-Star Int'l Co., Ltd., Jung-He (TW)

( * ) Notice: Subject to any disclaimer, the term of this patent is extended or adjusted under 35 U.S.C. 154(b) by 925 days.

(21) Appl. No.: 11/676,200

(22) Filed: Feb. 16, 2007

(65) Prior Publication Data

US 2008/0140391 A1 Jun. 12, 2008

(30) Foreign Application Priority Data

Dec. 8, 2006 (TW) .............................. 95145977 A

(51) Int. Cl.
*G10L 11/04* (2006.01)
*G10L 11/06* (2006.01)
*G06F 17/00* (2006.01)

(52) U.S. Cl. ....................... 704/207; 704/267; 704/208; 704/200; 700/94; 381/71.12

(58) Field of Classification Search ................. 704/200, 704/207, 208, 267; 700/94; 381/71.12
See application file for complete search history.

(56) References Cited

U.S. PATENT DOCUMENTS

| | | | | |
|---|---|---|---|---|
| 4,864,620 A | | 9/1989 | Bialick | |
| 5,175,769 A | * | 12/1992 | Hejna et al. | 704/211 |
| 5,341,432 A | * | 8/1994 | Suzuki et al. | 704/211 |
| 5,479,564 A | | 12/1995 | Vogten et al. | |
| 5,717,829 A | | 2/1998 | Takagi | |
| 5,749,064 A | * | 5/1998 | Pawate et al. | 704/213 |
| 5,828,995 A | * | 10/1998 | Satyamurti et al. | 358/1.18 |
| 6,173,255 B1 | * | 1/2001 | Wilson et al. | 704/216 |
| 6,496,794 B1 | | 12/2002 | Kleider et al. | |
| 6,718,309 B1 | | 4/2004 | Selly | |
| 6,944,510 B1 | * | 9/2005 | Ballesty et al. | 700/94 |
| 6,982,377 B2 | * | 1/2006 | Sakurai et al. | 84/654 |
| 7,412,379 B2 | * | 8/2008 | Taori et al. | 704/214 |
| 2002/0133334 A1 | * | 9/2002 | Coorman et al. | 704/211 |
| 2003/0033140 A1 | * | 2/2003 | Taori et al. | 704/214 |

(Continued)

FOREIGN PATENT DOCUMENTS

CN 1197976 A 11/1998

(Continued)

OTHER PUBLICATIONS

Verhelst, "Overlap-add methods for time-scaling of speech", Speech Communication, vol. 30, pp. 207-221, 2000.*

(Continued)

*Primary Examiner*—James S Wozniak
*Assistant Examiner*—Jialong He

(57) ABSTRACT

A method for varying speech speed is provided. The method includes the following steps: receive an original speech signal; calculate a pitch period of the original speech signal; define search ranges according to the pitch period; find a maximum within each of the search ranges of the original speech signal; divide the original speech signal into speech sections according to the maxima; obtain a speed-varied speech signal by applying a speed-varying algorithm to each speech section of the original speed signal according to a speed-varying command; and eventually, output the speed-varied speech signal.

7 Claims, 9 Drawing Sheets

U.S. PATENT DOCUMENTS

| | | | | |
|---|---|---|---|---|
| 2005/0273321 | A1 * | 12/2005 | Choi | 704/207 |
| 2006/0149535 | A1 * | 7/2006 | Choi et al. | 704/207 |

FOREIGN PATENT DOCUMENTS

| | | | |
|---|---|---|---|
| EP | 0681398 | A2 | 11/1995 |
| EP | 0910065 | A1 | 4/1999 |

OTHER PUBLICATIONS

Jang et al. “On the implementation of melody recognition on 8-bit and 16-bit microcontrollers”, Proc. ICICS-PCM, Dec. 2003.*

* cited by examiner

METHOD FOR VARYING SPEECH SPEED

CROSS-REFERENCES TO RELATED APPLICATIONS

This non-provisional application claims priority under 35 U.S.C. §119(a) on Patent Application No(s). 95145977 filed in Taiwan, R.O.C. on Dec. 8, 2006, the entire contents of which are hereby incorporated by reference.

BACKGROUND OF THE INVENTION

1. Field of Invention

The present invention relates to a method for varying speech speed, and more particularly to a method based on pitch period of speech signal to vary the speech speed.

2. Related Art

For the electronic apparatuses equipped with language learning functions, language conversations intended to learn may be recorded in the apparatus in advance. The electronic apparatus may be portable to allow the user learning language wherever and whenever. However, every user is at different learning level; the same speed for playing a section of conversation may be proper to understand for some users, but too fast to understand for others. Therefore, a so-called speed-varying function becomes one of the major functions of the language-learning apparatus.

Speed variation indicates that the language-learning apparatus varies the playing speed by user's demand while playing speech(s), accompanying with the same tone under various speeds. So ideally no matter the speed variation becomes slower or faster, users may all listen clearly; which is really helpful to language learning.

Although the conventional language-learning apparatus has the speed-varying function, usually the speech played through speed variation is distorted. Since the speech signal is a continuous analog signal, the voiceprint frequencies generated from different persons' pronunciations or different sound sources are different. A common speed-varying technology is to repeatedly play the sampling speech data, or to play intermittently by intervals, thereby facilitate the speed-varying function. Such approach will provide decelerated or accelerated playing speeds and the same signal envelope as the original speech. However, it also generates echoes and machine noises, leading to decreases of the voiceprint frequency; the effects are just like decelerating or accelerating the rotation speed of a recorder motor, which causes obvious distortions.

Therefore, how to maintain the tone of the original speech without distortion while the user operates the speed-varying function on a language-learning apparatus has become an issue required to be urgently solved.

SUMMARY OF THE INVENTION

Accordingly the present invention provides a method for varying speech speed, which aims at the processing of the speech signal to facilitate deceleration or acceleration of playing the speech by user's demand. Those output to the user's ears after speed variation will be clear speeches without losing its original tones.

A method for varying speech speed provided by an exemplary embodiment of the present invention includes the following steps. First, receive an original speech signal. Calculate a pitch period of the original speech signal. Define search ranges according to the pitch period. Find a maximum within each of the search ranges of the original speech signal. Divide the original speech signal into speech sections according to the maxima. Obtain a speed-varied speech signal by applying a speed-varying algorithm to each speech section of the original speed signal according to a speed-varying command. Eventually, output the speed-varied speech signal.

According to the present invention, first the original speech signal is divided into plural speech sections. The divided sections is not fixed as the conventional technology, but defined according to the Sum of Magnitude Difference Function (SMDF) or Average of Magnitude Difference Function (AMDF). The pitch period of the original speech signal will be obtained in advance, and then a maximum will be found according to the data around the pitch period. Afterwards, use the found maxima to divide the original speech signal into the plural speech sections. The advantage of above solution is to proceed through speed variation process by using the smallest unit in the speech signal, namely, the pitch period. Therefore, the present invention actually uses a more precise solution to improve the quality of relevant speed variation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1:
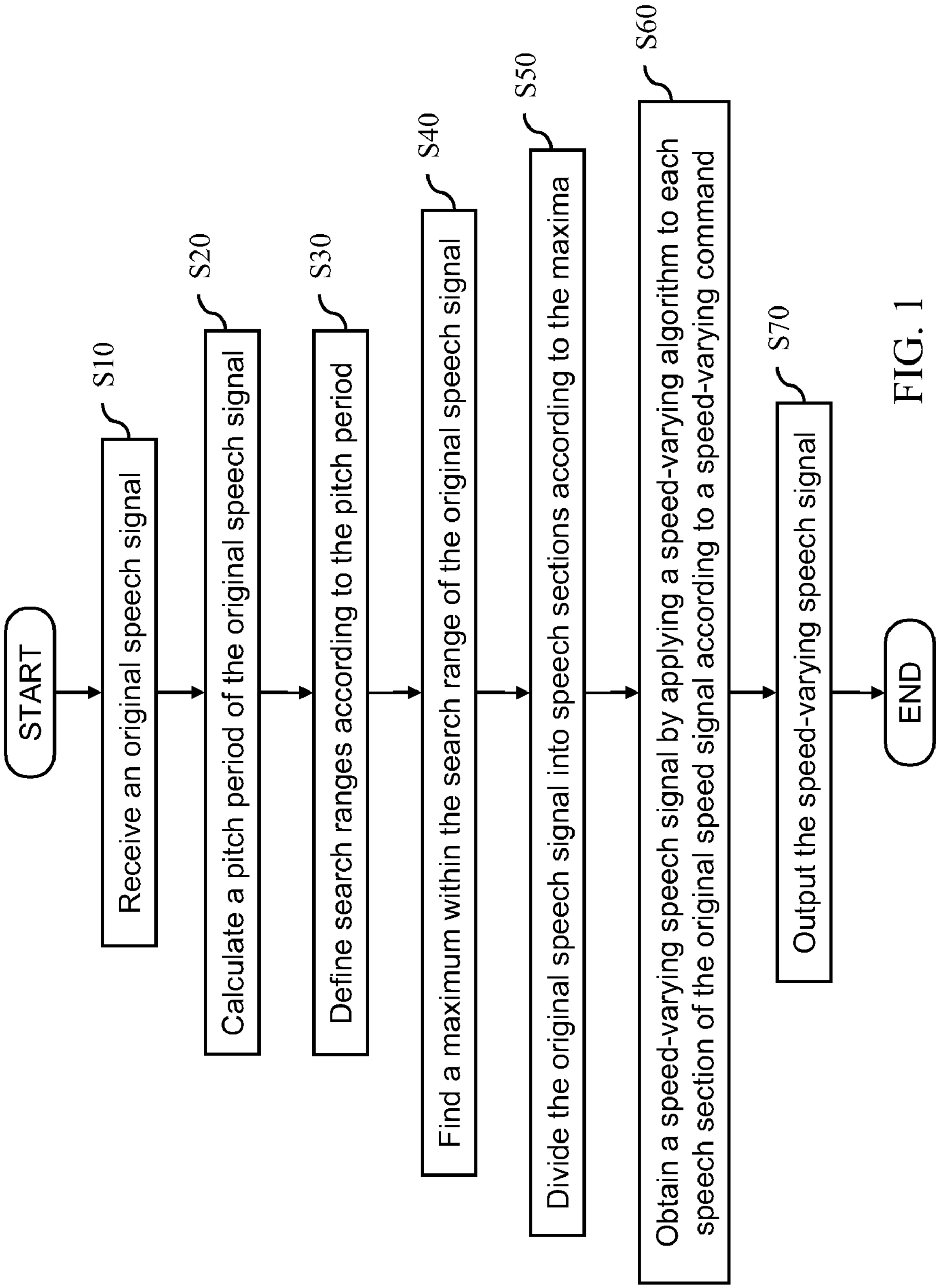
FIG. 1 is a flow chart of an embodiment a method for varying speech speed according to the present invention.

Please refer to FIG. 1, which shows a flow chart of a method for varying speech speed using a microprocessor. The method includes the following steps.

Step S10: Receive an original speech signal. The original speech signal is language declamation such as English, Japanese conversation and etc.

Step S20: Calculate a pitch period of the original speech signal. The sound range of human voice is about 50 Hz to 1000 Hz. Everyone will read a same section of conversation and make various ways of speech. That is because every person has a different voice timbre. The differences between voice timbres represent different soundwave shapes for their pitch periods. Accordingly, every different speech signal has its different pitch period. As a result of every individual's unique voice timbre, the speech signal generated by the same person will have approximately the same pitch period; even though the speech has different contents.

Figure 2:
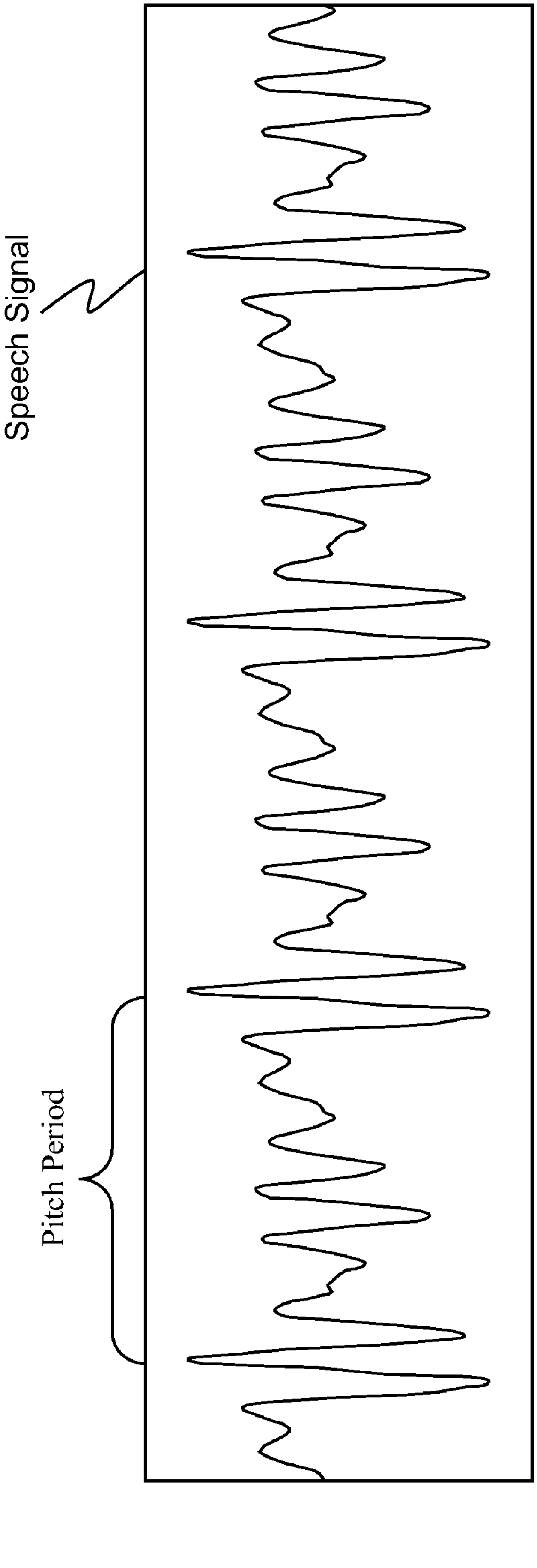
FIG. 2 shows the pitch period of the speech signal.

Please refer to FIG. 2, which shows the pitch period of the speech signal. As shown in the drawing, there are high and low changes existing in a section of a speech signal. However, when the pitch period is found, we can clearly discover that the speech signal is combined by multiple sections of the pitch period. Therefore right from the beginning of speed variation processing, we should first locate the basic combination unit of the speech signal, the "pitch period", to precisely enhance the quality of speed variation.

Figure 3:
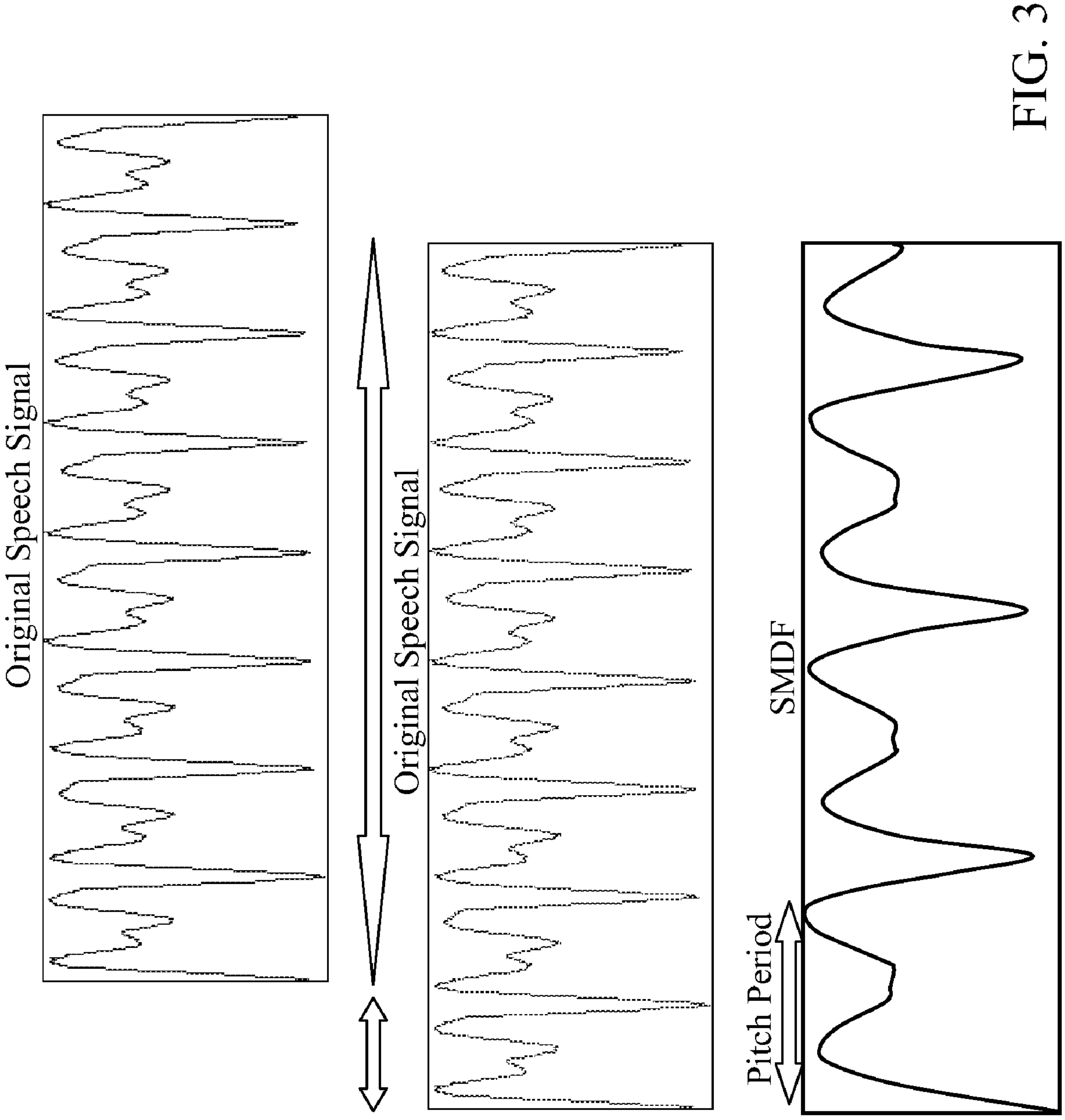
FIG. 3 is an explanatory diagram of using the Sum of Magnitude Difference Function (SMDF) to calculate the pitch period.

Please refer to FIG. 3, which shows an explanatory diagram of using the Sum of Magnitude Difference Function (SMDF) to calculate the pitch period. First, displace the original speech signal to perform a point-to-point subtraction on the overlap portion of the original and new speech signals, obtain the absolute values of all points and then add up. Repeat the aforesaid processes for n times will obtain n inner product values, which is so-called Sum of Magnitude Difference Function (SMDF).

In addition, the above SMDF calculation will make smaller curves due to the shorter overlapped waveform. To avoid such situation, we can proceed to obtain a normalized SMDF. Namely, divide the inner product of the overlapped portion by the amount of the overlapped dots to obtain the conventional AMDF (Average of Magnitude Difference Function). Therefore, using either SMDF or AMDF may calculate the pitch period of the original speech signal.

Step S30: Define search ranges according to the pitch period calculated in step S20. Although a section of the original speech signal is combined by multiple sections of the pitch period, there are still differences between high and low sounds generated as result of different speech contents (different contents of declaiming languages). So the pitch periods will have minor difference in their period sizes. Consequently, after calculate the pitch period(s) we define a search range around each of the pitch periods to facilitate the following search operations.

Step S40: Find a maximum within each of the search ranges of the original speech signal. Use each of the search ranges defined in step S30 as a unit to search in the original speech signal. Record the maximum found in each of the search ranges in the original speech signal.

Figure 4:
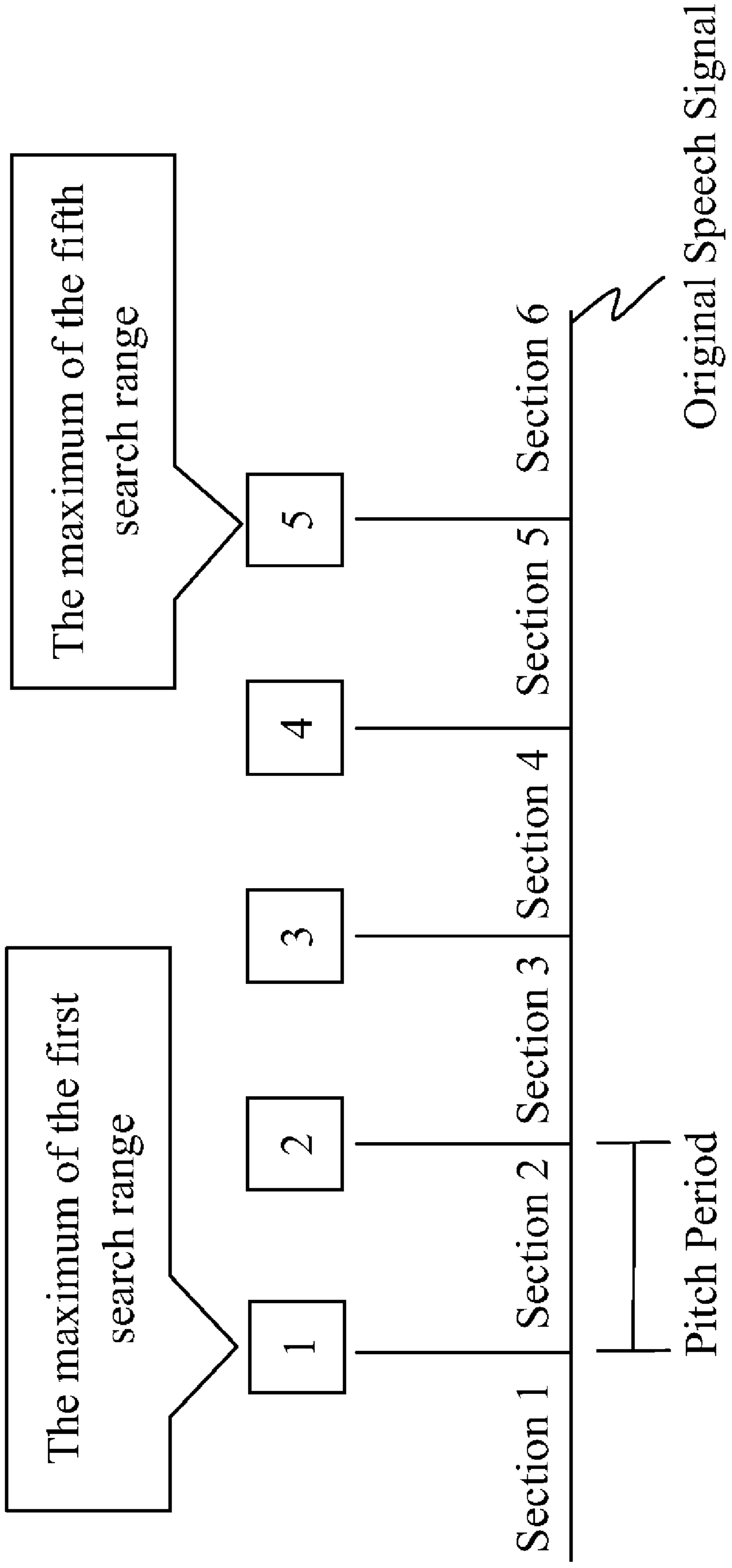
FIG. 4 shows a division diagram with the speech sections of the original speech signal.

Step S50: Divide the original speech signal into plural speech sections according to the maxima. Please refer to FIG. 4, which shows a division diagram with the speech sections of the original speech signal. As shown in the drawing, the maxima searched by executing step S40 divides the original speech signal into plural areas called "speech sections" according to the present invention.

Figure 5:
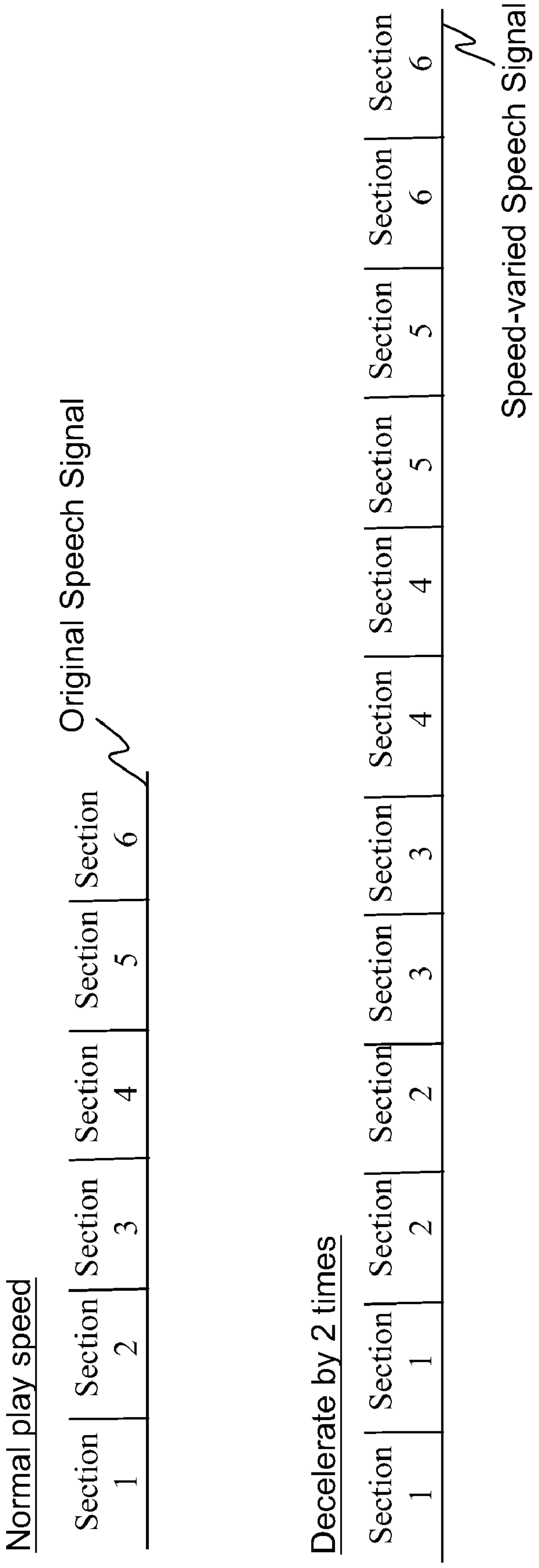
FIG. 5 shows an explanatory diagram for a speed-varying algorithm when the speed-varying command is to decelerate.

Step S60: Obtain a speed-varied speech signal by applying a speed-varying algorithm to each speech section of the original speed signal according to a speed-varying command. The speed-varying command is given by the user. When the user thinks the speech signal is played too fast, the speed-varying command to decelerate may be given to the apparatus. When the speed-varying command is to decelerate, the speed-varying algorithm duplicates some of the speech section to make the speed-varied speech signal longer than the original speech signal. Please refer to FIG. 5, which shows an explanatory diagram for a speed-varying algorithm when the speed-varying command is to decelerate. Assume the original speech signal is divided into 6 speech sections. When the user gives a speed-varying command to decelerate by 2 times, the speed-varying algorithm will duplicate each of the 6 speech sections to obtain a speed-varied speech signal with 12 speech sections. Thus, the speed-varied speech signal is twice longer than the original speech signal and reach a play speed decelerated by two times.

Figure 6:
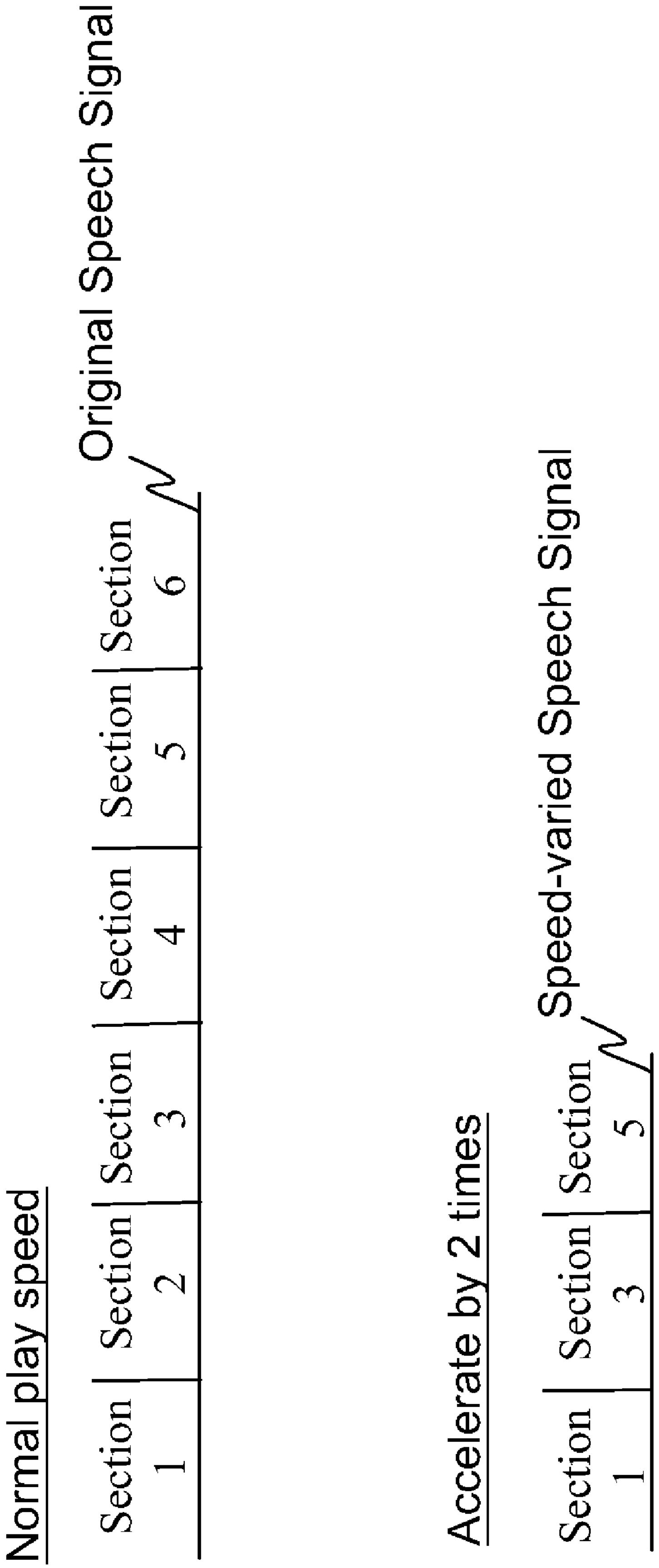
FIG. 6 shows an explanatory diagram for another speed-varying algorithm when the speed-varying command is to accelerate.

Oppositely, when the speed-varying command is to accelerate, the speed-varying algorithm will delete some of the speech sections to make the speech signal shorter than the original speech signal. Please refer to FIG. 6, which shows an explanatory diagram for another speed-varying algorithm when the speed-varying command is to accelerate. Assume the original speech signal is divided into 6 speech sections as well. When the user gives a speed-varying command to accelerate by 2 times, the speed-varying algorithm will delete the speech section with even numbers to obtain a speed-varied speech signal with only 3 speech sections. Thus, the speed-varied speech signal is only half of the original speech signal and the play speed is accelerated by two times.

Step S70: Eventually, output the speed-varied speech signal. The speed variation procedure is now completed.

Figure 7:
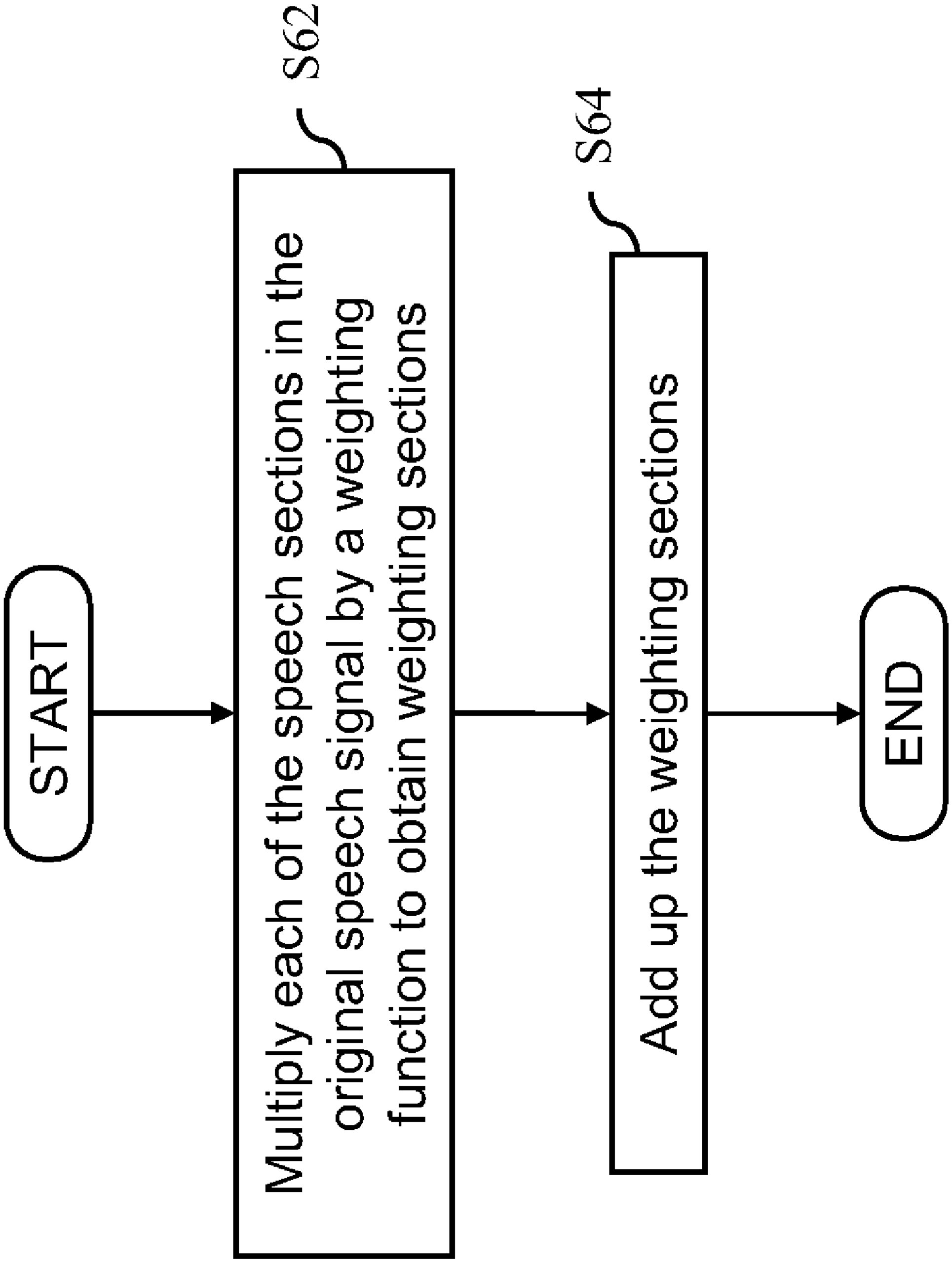
FIG. 7 shows a detailed flow chart for using the speed-varying algorithm.

Please refer to FIG. 7, which shows a detailed flow chart for using the speed-varying algorithm. The speed-varying algorithm in step S60 simply uses duplication and deletion of some of the speech section to accomplish the acceleration and deceleration of the speech signal. However, to improve the generation of intermittent sounds or echoes, the speed-varying algorithm in step S60 may includes the following steps.

Step S62: Multiply each of the speech sections in the original speech signal by a weighting function to obtain a weighting section; wherein in each of the search ranges the weighting function is an increasing function when prior to the maximum but a decreasing function when posterior to the maximum. Therefore, the weighting function may be a triangle wave function.

Step S64: Add up the weighting sections. Since each of the speech sections has been multiplied by the weighting function and becomes the weighting section, we can add up these weighting sections afterwards according to the speed-varying command. Therefore, the speed-varied speech signal will as clear as the original speech signal without distortions. Neither intermittent sounds nor echoes will be generated.

Figure 8:
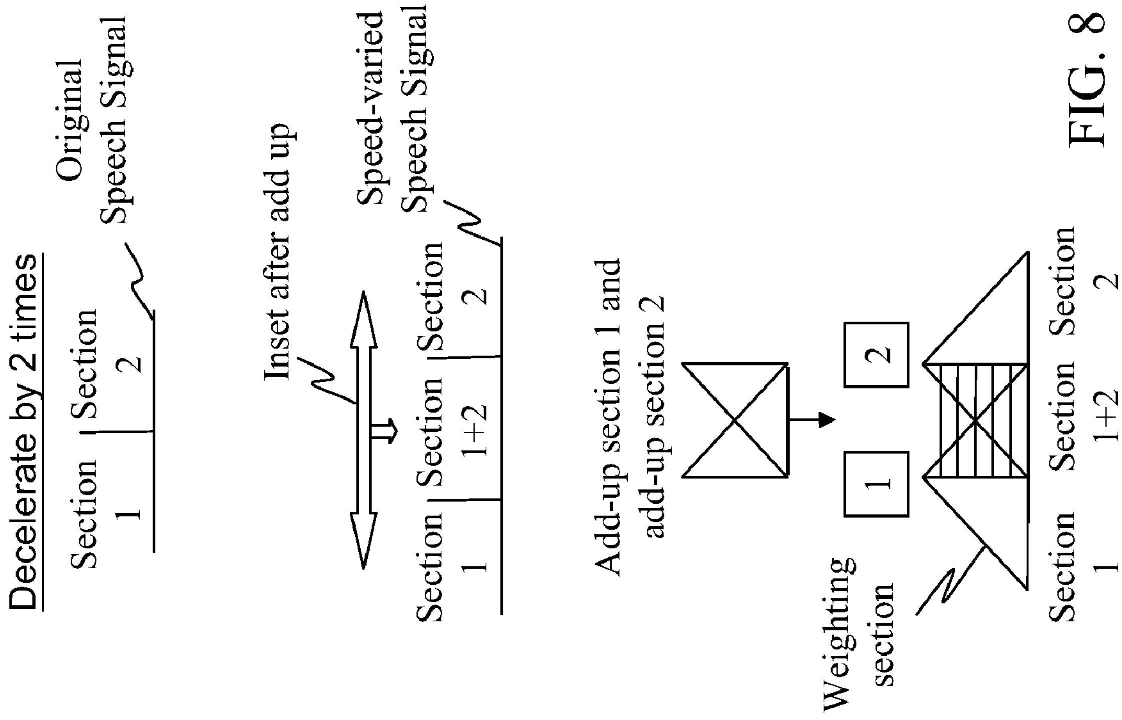
FIG. 8 shows an explanatory diagram for adding up through the speed-varying algorithm and insetting into the speech sections.

The aforesaid add-up speed-varying algorithm may further include the step of insetting the add-up weighting section between the speech sections. Please refer to FIG. 8, which shows an explanatory diagram for adding up through the speed-varying algorithm and insetting into the speech sections. Assume the speed-varying command is to decelerate by two times. First multiply each of the speech sections by the weighting function to obtain the weighting section; the weighting function is a triangular wave function as shown in the drawing. Then, add up the weighting section 1 and the weighting section 2, and inset between section 1 and section 2. At the moment, if the original speech signal is divided into the speech sections 1, 2 . . . *n*, the speed-varied speech signal will include the speed sections 1, 1+2, 2, 2+3, 3 . . . *n* after add-up and inset.

Figure 9:
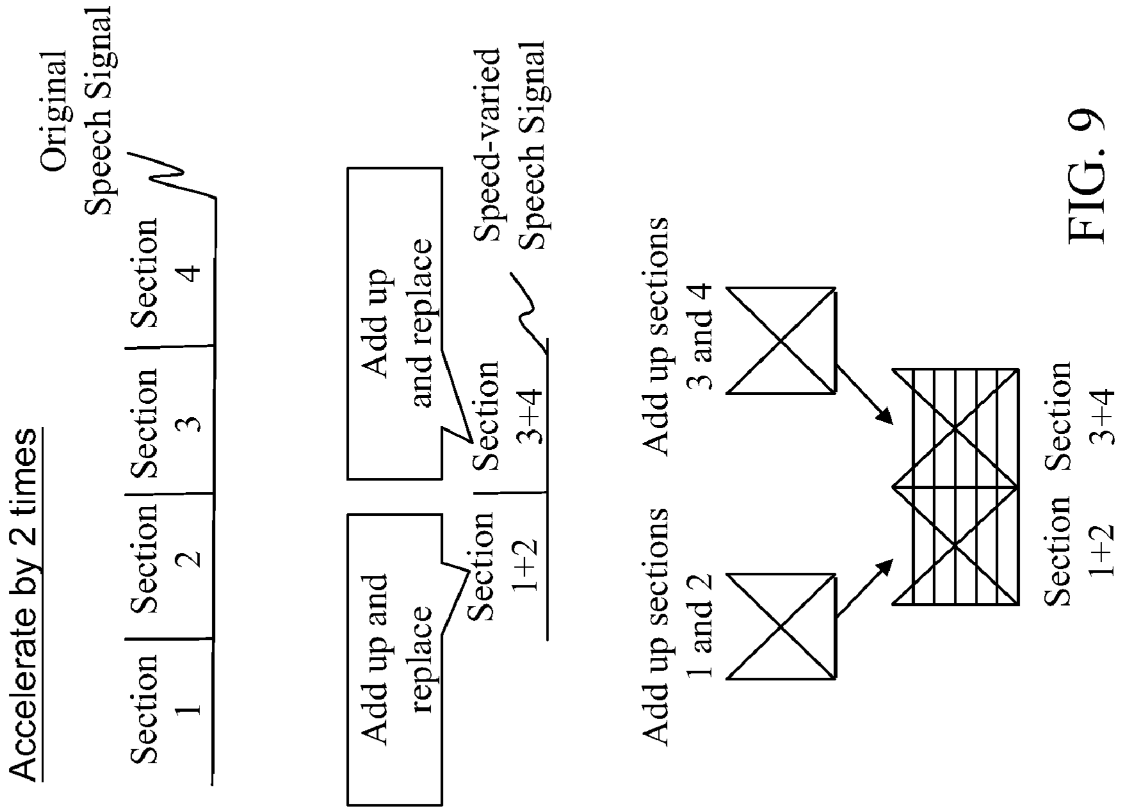
FIG. 9 shows an explanatory diagram for adding up through the speed-varying algorithm and replacing the speech sections.

Oppositely, the add-up speed-varying algorithm may further include another step of replacing the speech section(s) with the add-up weighting section(s). Please refer to FIG. 9, which shows an explanatory diagram for adding up through the speed-varying algorithm and replacing the speech sections. Assume the speed-varying command is to accelerate by two times. First multiply each of the speech sections by the weighting function to obtain the weighting section; the weighting function is a triangular wave function as well. Next, add up the weighting sections by pairs and replace the speech sections before add-up. For example, use the add-up weighting section 1 and the add-up weighting section 2 (section 1+2) to replace the speech section 1 and the speech section 2 (section 1, section 2).

Figure 10:
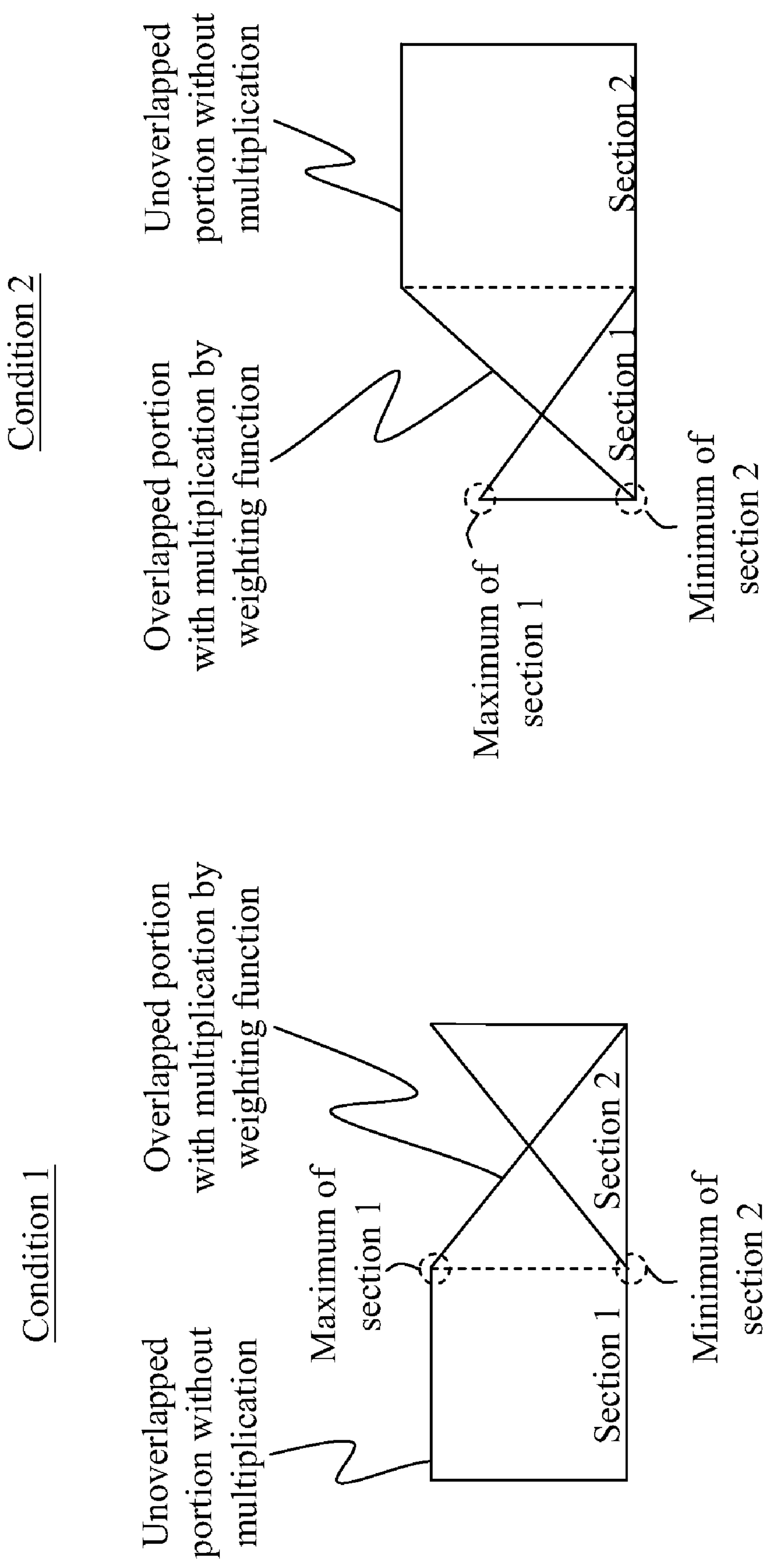
FIG. 10 shows an explanatory diagram for adding up the speech sections with different sizes.

Eventually, please refer to FIG. 10, which shows an explanatory diagram for adding up the speech sections with different sizes. If the speech sections with different sizes is multiplied by the weighting function and the weighting function is a triangular wave function, there will be two conditions while adding up. In condition 1, section 1 is greater than section 2; in condition 2, section 2 is greater than section 1. No matter in condition 1 or condition 2, when the speech sections with different sizes are about to be added up, only multiply the overlapped portion of the speech sections by the weighting function; the unoverlapped portion is not required to be multiplied by the weighting function. Consequently, the maximum of the overlapped portion of section 1 (section 2) may be ensured mating to the minimum of section 2 (section 1); or, the minimum of section 1 (section 2) may be ensured mating to the maximum of section 2 (section 1). Such solution allows the user hearing a smooth speed-varied speech signal as the original speech signal after processed through the add-up speed-varying algorism.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for varying speech speed, comprising the steps of:

receiving an original speech signal;

calculating, using a microprocessor, a pitch period of the original speech signal;

defining search ranges according to the pitch period;

finding a maximum within each of the search ranges of the original speech signal;

dividing the original speech signal into a plurality of speech sections according to the maxima;

obtaining a speed-varied speech signal by applying a speed-varying algorithm to each of the speech sections according to a speed-varying command; and outputting the speed-varied speech signal;

wherein the speed-varying algorithm comprises the steps of:

multiplying each of the speech sections in the original speech signal by a weighting function to obtain a plurality of weighting sections; and adding up the weighting sections;

wherein in each of the search ranges the weighting function is an increasing function when prior to the maximum but a decreasing function when posterior to the maximum;

wherein the weighting function is a triangular wave function; and wherein if the speech sections have different sizes, the overlapped portion of the speech sections is multiplied by the weighting function, and the unoverlapped portion is not multiplied by the weighting function.

2. The method of claim 1, wherein the pitch period is calculated by using a Sum of Magnitude Difference Function (SMDF).

3. The method of claim 1, wherein the pitch period is calculated by using an Average of Magnitude Difference Function (AMDF).

4. The method of claim 1, wherein through the speed-varying algorithm some of the speech sections are duplicated to make the speed-varied speech signal longer than the original speech signal when the speed-varying command is to decelerate.

5. The method of claim 1, wherein through the speed-varying algorithm some of the speech sections are deleted to make the speed-varied speech signal shorter than the original speech signal when the speed-varying command is to accelerate.

6. The method of claim 1, wherein the speed-varying algorithm further comprises the step of insetting the add-up weighting section between the speech sections.

7. The method of claim 1, wherein the speed-varying algorithm further comprises the step of replacing the speech sections with the add-up weighting sections.

* * * * *